United States Patent [19]

Collart et al.

[11] Patent Number: 4,772,662

[45] Date of Patent: Sep. 20, 1988

[54] PROCESS FOR MANUFACTURING HEAT-STABLE OXYMETHYLENE COPOLYMERS

[75] Inventors: André Collart, Rixensart; Fredy Declerck, Grimbergen, both of Belgium

[73] Assignee: Solvay & Cie. (Société Anonyme), Brussels, Belgium

[21] Appl. No.: 900,915

[22] Filed: Aug. 26, 1986

[30] Foreign Application Priority Data

Aug. 26, 1985 [FR] France ............................. 85 12824

[51] Int. Cl.$^4$ .............................................. C08G 2/30
[52] U.S. Cl. ................................. 525/54.23; 525/54.21
[58] Field of Search ................ 525/54.21, 54.2, 54.23; 524/732, 733, 42, 43, 44, 45, 46

[56] References Cited

U.S. PATENT DOCUMENTS

| | | | |
|---|---|---|---|
| 3,072,609 | 1/1963 | Berardinelli et al. | 528/241 |
| 3,642,942 | 2/1972 | Castner et al. | 525/54.21 |
| 4,280,970 | 7/1981 | Kesting | 525/54.21 |

FOREIGN PATENT DOCUMENTS 1221148  5/1960  France .
1287151  1/1962  France .

Primary Examiner—Delbert R. Phillips
Assistant Examiner—Nathan M. Nutter
Attorney, Agent, or Firm—Spencer & Frank

[57] ABSTRACT

Process for manufacturing oxymethylene copolymers stabilized against thermal degradation, comprising the heating of the copolymer in a medium containing water and a disubstituted cellulose ether.

11 Claims, No Drawings

PROCESS FOR MANUFACTURING HEAT-STABLE OXYMETHYLENE COPOLYMERS

The present invention relates to a process for manufacturing oxymethylene copolymers stabilized against thermal degradation.

Polyoxymethylenes or polyacetals containing linkages of repeated oxymethylene ($-CH_2O-$) units have been known for many years. They can be manufactured by polymerization of anhydrous formaldehyde or its cyclic trimer, trioxane.

Homopolymers of polyoxymethylene are, however, thermally unstable. This thermal instability leads to the degradation of the polymers with the evolution of formaldehyde when they are exposed to high temperatures for an extended period, in particular in the course of their use.

This drawback has been remedied by manufacturing, for example, modified polyoxymethylenes containing, in combination with the oxymethylene groups, optionally substituted oxyalkylene groups containing at least two adjacent carbon atoms. Similar modified polyoxymethylenes, of higher thermal stability than the corresponding homopolymer, have been obtained by copolymerizing trioxane with other cyclic ethers containing at least two adjacent carbon atoms such as, for example, ethylene oxide, 1,3- dioxolane, 1,3- and 1,4-,dioxanes, and the like (CELANESE CORP. French Patent A-1,221,148), or alternatively with a comonomer such as epichlorohydrin (CELANESE CORP. U.S. Pat. No. A-3,072,609).

These modified polyoxymethylenes are themselves, nevertheless, relatively degraded under the effect of thermal stress, due to the instability of the oxymethylene ends of the polymeric chains, between the final oxyalkylene group and the terminal hydroxyl group.

A traditional means of remedying this drawback consists in performing depolymerization by selective hydrolysis of these chain ends so as to obtain a heat-stable product. Such a means is described, for example, in CELANESE CORP. French Patent A-1,287,151.

This selective hydrolysis is, however, the source of a serious problem. To be effective, it must, in effect, be performed at a temperature as close as possible to the melting point of the modified polyoxymethylene to which it is applied. In fact, under these conditions, and especially when the melting point of the polymer is relatively high, this hydrolysis most frequently leads to solidification of the polymer in the medium in which the hydrolysis is performed.

The present invention is directed towards the provision of a process for manufacturing heat-stable oxymethylene copolymers which does not possess this drawback.

To this end, the invention relates to a process for manufacturing oxymethylene copolymers stabilized against thermal degradation, comprising the heating of the copolymer in a medium containing water and a disubstituted cellulose ether.

The copolymers to which the process according to the invention is applied principally contain linkages of repeated oxymethylene units and also contain repeated oxyalkylene units. By repeated oxyalkylene units, it is understood that oxyalkylene groups containing at least two adjacent carbon atoms are denoted. These oxyalkylene groups can contain substituents such as alkyl groups which are themselves optionally substituted, for example with halogens. Typical substituents are, for example, methyl, ethyl, and chloromethyl groups. By way of examples of preferred repeated oxyalkylene units, the oxyethylene group ($-OCH_2-CH_2-$) and the 2-chloromethyloxyethylene group

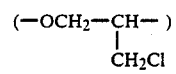

may be mentioned.

In general, the proportion of repeated oxyalkylene units present in the copolymers is between 0.05 and 20 mol %, preferably between 0.1 and 10 mol %. The process according to the invention applies especially well to the manufacture of copolymers containing between 1 and 4 mol % of repeated oxyalkylene units. These repeated oxyalkylene units are preferably of the same nature, but the presence in the copolymers of oxyalkylene units of different natures is not ruled out.

These copolymers can be obtained in the traditional manner by copolymerizing trioxane and a suitable amount of a comonomer chosen from cyclic ethers in which the molecule contains at least two adjacent carbon atoms and in which the oxyalkylene group corresponds to the limitations mentioned above. By way of examples of preferred comonomers, ethylene oxide, 1,3-dioxolane, 1,3-and 1,4-dioxanes, 1,3,5-trioxepane, 1,3,6-trioxocane, epichlorohydrin and 4-chloromethyl-1,3-dioxolane may be mentioned, ethylene oxide being especially preferred.

The copolymerization is performed, in a known manner, in the presence of a catalyst based on a coordination complex of boron fluoride with an oxygen-containing organic compound containing an electron-donating atom such as oxygen or sulphur. By way of oxygen-containing organic compounds which can be used for forming the coordination complex with boron fluoride, alcohols, phenols, ethers, acids, acid anhydrides, esters, ketones, aldehydes, dialkyl sulphides and mercaptans may be mentioned. The preferred catalysts are boron fluoride etherates, more especially the coordination complexes of boron fluoride with diethyl and diisoamyl ethers.

In general, the catalyst is present in the copolymerization medium at a concentration such that the boron fluoride content is between approximately 0.001 and approximately 0.1% by weight relative to the weight of trioxane present in this medium.

The trioxane and the chosen comonomer or comonomers are generally introduced into the copolymerization medium in as anhydrous and as pure a form as possible, thereby enabling copolymers of high average molecular weight to be obtained in improved yield.

The copolymerization can be performed in the absence or presence of an anhydrous organic solvent which is inert with respect to the monomers.

When the copolymerization is performed in the absence of an organic solvent, the reaction is most generally carried out in trioxane in the molten state in which the comonomer or comonomers and the catalyst have been dissolved. Preferably, however, the copolymerization is performed in the presence of an organic solvent in which trioxane is at least partially soluble. This organic solvent is generally chosen from aliphatic, cycloaliphatic and aromatic hydrocarbons.

By way of examples of aliphatic hydrocarbons, alkanes such as n-hexane, n-heptane, n-octane and n- nonane, their isomers and mixtures thereof, may be mentioned.

By way of examples of cycloaliphatic hydrocarbons, cycloalkanes such as cyclohexane may be mentioned.

By way of examples of aromatic hydrocarbons, benzene and its substitution derivatives, such as toluene and xylenes, may be mentioned.

It is generally preferable to perform the copolymerization in the presence of an alkane or a mixture of alkanes containing from 7 to 9 carbon atoms which, under certain conditions of concentration and temperature, lead to a two-phase mixture, in which the light phase consists essentially of the alkane containing a little trioxane and in which the heavy phase, which is the preferred location for the polymerization, is very rich in trioxane.

The copolymerization is generally performed at a temperature between 0° and 100° C., preferably between 30° and 80° C., for a period generally between approximately 5 minutes and approximately 48 hours, preferably between 30 minutes and 20 hours.

When the copolymerization is performed in the presence of an organic solvent as mentioned above, the initial concentration of trioxane in the medium is generally between 0.5 and 900% by weight relative to the weight of solvent, preferably between 10 and 400% by weight. The initial concentration of comonomer in the medium is determined in accordance with the proportion in which it is desired to incorporate it in the final copolymer.

This concentration can be adjusted, taking into account the reactivity of the chosen comonomer and its degree of incorporation in the copolymer, which are determined by prior routine trials. In general, this concentration of comonomer is between 0.1 and 50 mol %, and preferably between 0.2 and 20 mol %, relative to the trioxane present in this medium.

At the end of the actual copolymerization stage, an agent which neutralizes the catalytic activity is generally added to the polymerization medium; by way of such an agent, aliphatic amines such as tributylamine, for example, may be mentioned.

According to the invention, the copolymer obtained is then heated in a medium containing water and a disubstituted cellulose ether.

The general operating conditions for this treatment of the copolymer by heating in the said medium (hereinafter referred to for convenience as the "hydrolysis medium") are chosen so as to cause depolymerization by selective hydrolysis of the unstable oxymethylene ends of the macromolecular chains of the copolymer.

To this end, the treatment of the copolymer by heating can be most conveniently formed in the same medium in which the copolymerization has been carried out; in this case, there are simply added to this medium—in the vessel in which copolymerization has been performed or in a different vessel to which this medium is transferred at least water and a disubstituted cellulose ether, as well as, if it has not been added previously, the abovementioned agent which neutralizes catalytic activity, to constitute the hydrolysis medium according to the invention; it is also possible to perform this treatment on the copolymer separated from the medium in which it has been produced; in this latter case, the copolymer is washed and generally dried to remove the monomers which have not reacted, the possible organic solvent and the inactivated catalyst resipossible dues.

In all cases, the hydrolysis medium hence contains:

(1) the copolymer;
(2) water;
(3) the disubstituted cellulose ether and also, where appropriate,
(4) an agent for adjusting the pH as defined below;
(5) the organic solvent in the presence of which the copolymerization has been performed;
(6) non-copolymerized trioxane; and
(7) the inactivated catalyst residues.

Water (2) can be introduced into the hydrolysis medium, for example, in the form of steam under pressure or in liquid form; it is preferably present in this latter form, which facilitates the dissolution of the disubstituted cellulose ether (3).

An essential characteristic of the process according to the invention is the presence, in the hydrolysis medium, of disubstituted cellulose ether (3). In effect, it has been found, surprisingly, that only the presence of such an ether prevents the solidification of the copolymer in the hydrolysis medium. By disubstituted cellulose ethers, it is understood that cellulose ethers are denoted in which at least part of the hydroxyl groups present in the constituent anhydroglucose units are substituted with two different substituents chosen from alkyl and hydroxyalkyl radicals.

These disubstituted cellulose ethers hence contain anhydroglucose units which may be represented by the formula:

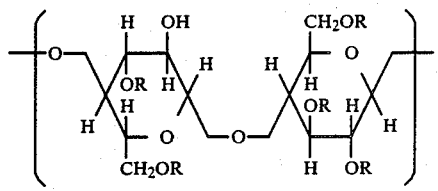

in which R can represent hydrogen or a radical chosen from alkyl and hydroxyalkyl radicals, with the reservation that the groups R are not all identical and that at least some anhydroglucose units contain two different radicals.

The alkyl radicals are preferably chosen from methyl, ethyl, propyl and butyl radicals. A most especially preferred alkyl radical is the methyl radical.

The hydroxyalkyl radicals are preferably chosen from hydroxyethyl, hydroxypropyl and hydroxybutyl radicals.

A preferred class of disubstituted cellulose ethers which can be used according to the invention consists of methyl ethyl ethers of cellulose containing, in addition, hydroxyalkoxyl substituents containing from 2 to 4 carbon atoms (hydroxyethoxyl, hydroxypropoxyl or hydroxybutoxyl radicals). In general, these methyl ethers of cellulose have a content of methoxyl groups of between approximately 18 and approximately 32% by weight and a content of hydroxyalkoxyl groups of between approximately 3 and approximately 30% by weight.

The viscosity of these methyl ethers of cellulose is not critical and is generally between approximately 10 and approximately 4000 cP (centipoises) (measured in 2% strength aqueous solution at a temperature of 20° C.). Preferably, this viscosity is between approximately 20 and approximately 1500 cP.

Among these products, excellent results have been recorded with the methylhydroxyethyl celluloses marketed by Henkel under the name MHEC 250 and by Hoechst under the names TYLOSE MH 20, —MH 300 and —MH 1000, and with the methylhydroxypropyl celluloses marketed by Celanese under the name CELACOL HPM450, by Henkel under the name CULMINAL MHPC 100 and by Dow Chemical under the names METHOCEL F50 and K100.

During the treatment of the copolymer by heating, the byproducts of the hydrolysis cause acidification of the hydrolysis medium. This trend in the hydrolysis medium towards acid pH values can cause the cleavage of the polymeric chains hence a reduction, which can be very severe, in the average molecular mass of the copolymer. In consequence, inasmuch as the pH of the hydrolysis medium tends towards excessively low values, an agent (4) for adjusting the pH, generally chosen from organic bases, inorganic bases and buffer mixtures, is added where appropriate. By way of organic bases, amines and amides which are preferably water-soluble may be mentioned. By way of inorganic bases, alkali metal and ammonium hydroxides may be mentioned. Examples of organic and inorganic bases which can be used as agents (4) are the compounds which are reactive towards formaldehyde, listed in Hoechst U.S. Pat. No. A-3,225,005.

The agent (4) can also be chosen from buffer mixtures, such as mixtures of a weak acid and one of its salts and mixtures of two salts of weak acids. A preferred buffer mixture is mixture of sodium and/or potassium mono- and dibasic phosphates.

The hydrolysis medium can also, where appropriate, contain the ingredients (5) to (7), especially if this medium is the same medium in which the copolymerization has been carried out.

In addition to the ingredients (1) to (3) and the possible ingredients (4) to (7), the hydrolysis medium can also optionally contain other ingredients, such as solvents and/or swelling agents for the polymer, generally chosen from monohydric alcohols such as methanol and polyhydric alcohols such as ethylene glycol and glycerol, as well as the ethers and esters of these latter; the hydrolysis medium can also contain the traditional additives for polyacetals, such as stabilizers, antioxidants, and the like.

When the hydrolysis medium is derived from the same medium in which the copolymerization has been carried out, it most frequently consists of an upper organic phase and a lower aqueous phase which contains the majority of the ingredients (1), (2) and (3).

The duration of the treatment of the copolymer by heating is conditioned, in particular, by the nature of the ingredients of the hydrolysis medium and their concentration; it is generally between a few seconds and 10 hours approximately, and preferably between 5 minutes and one hour. This treatment is performed by bringing the hydrolysis medium to a temperature below the degradation temperature of the copolymer, generally between approximately 80° and approximately 180° C., preferably between approximately 130° and approximately 165° C.

The concentration of the ingredients (1) to (3) and, where appropriate, (4) to (7), in the hydrolysis medium is not critical and can vary within a wide range. The copolymer (1) is generally present in the hydrolysis medium in the proportion of 1 to 50%, and preferably in the proportion of 5 to 20%, of the total weight of the latter.

Water (2), in which the disubstituted cellulose ether (3) and the possible agents for adjusting the pH (4) are most frequently present in the dissolved state, is generally present in the proportion of 20 to 80% of the total weight of the hydrolysis medium, preferably in the proportion of 30 to 70% of the weight.

As regards the disubstituted cellulose ether (3), this is present in an at least sufficient amount to prevent the solidification of the copolymer. This amount, which is determined by routine trials for each particular ether under the chosen operating conditions, generally varies between 0.01 and 10% of the weight of copolymer present in the medium, preferably between 0.1 and 5% of the weight. Excessively large amounts of ether (3) are inadvisable, especially when the hydrolysis medium also contains the solvent (5), since emulsion formation then occurs, making final separation of the copolymer difficult.

The organic solvent (5) and non-copolymerized trioxane (6) which form, when they are present together, the upper organic phase of the hydrolysis medium, generally represent from 15 to 75% of the weight of the latter, preferably from 25 to 50% of the weight approximately. In addition, when the amount of trioxane (6) possibly present is very distinctly greater than that of the copolymer (1) in the hydrolysis medium, a tendency to agglomeration of the copolymer has been observed. It is consequently preferred that the amount of trioxane (6) is at most equal to that of the copolymer in this medium.

Finally, the optional adjusting agent (4) is added to the hydrolysis medium in an amount, determined by the experiment in the light of the possible presence of inactivated catalyst residues, such that the pH is generally maintained between 8 and 3, preferably between 7 and 5.

The copolymer obtained, separated from the hydrolysis medium by any traditional means, is generally washed and dried. The copolymers manufactured according to the process of the invention are collected in the form of regular, well-shaped beads. Their thermal stability is exceptional.

The invention is illustrated but not limited by the examples which follow.

EXAMPLE 1

In a 5 liter reactor equipped with a stirring system, the following are introduced:
  985 g of trioxane purified by crystallization from its solution in the organic solvent ($C_{7-9}$ paraffin cut marketed by ESSO under the name ISOPAR-E) used for extracting it from its aqueous synthesis medium;
  40 g of ethylene oxide distilled and dried on a molecular sieve
  1000 g of ISOPAR-E; and
  0.125 g of a catalyst which is a coordination complex of boron fluoride with diethyl ether, diluted in approximately 5 g of hexane.

The polymerization is then carried out for 2 hours at 60° C. At the end of this period, the catalyst is deactivated by injecting tributylamine in the mole ratio tributylamine/catalyst of 5.

The polymerization medium is then treated with water containing 0.13% by weight of methylhydroxypropyl cellulose, marketed by Dow Chemical under the name METHOCEL K 100, and containing a buffer mixture consisting of $Na_2HPO_4$ and $KH_2PO_4$ in an amount suitable for maintaining the pH of the medium at between 6.0 and 6.5 approximately.

The composition of the hydrolysis medium is hence as follows, in % by weight:
copolymer: 12.5
unpolymerized trioxane: 12.5
organic solvent: 25
water (containing the abovementioned additives): 50.

The hydrolysis is continued, maintaining the medium at 150oC for 30 minutes. The copolymer obtained at the end of this operation is readily separated from the hydrolysis medium and dried in the traditional manner. It contains approximately two mol% of oxyethylene units and takes the form of beads of average sizes between 0.1 and 1 mm. It is characterized by a "base stability" (thermal stability determined as described in UBE Industries Ltd. U.S. Pat. No. A-4,035,338, column 6, lines 15 to 35) of 97%.

EXAMPLE 2

Example 1 is repeated exactly, except that the water added to the polymerization medium contains 0.13% by weight of methylhydroxyethyl cellulose marketed by Henkel under the name MHEC 250.

The copolymer obtained at the end of this operation possesses the same characteristics as that in Example 1.

EXAMPLE 3 (comparative)

Example 1 is repeated exactly, except that the water added to the polymerization medium contains 0.13% by weight of methyl cellulose marketed by Dow Chemical under the name METHOCEL MC 15. Solidification of the copolymer in the hydrolysis medium is observed. This example shows that cellulose ethers which are not disubstituted do not enable the solidification of the copolymer in the hydrolysis medium to be avoided.

We claim:

1. A process for manufacturing an oxymethylene copolymer stabilized against thermal degradation, comprising:
   heating an oxymethylene copolymer after copolymerization in an aqueous medium containing a disubstituted cellulose ether to hydrolyze unstable oxymethylene ends, and
   separating said oxymethylene copolymer from said aqueous medium containing a disubstituted cellulose ether.

2. The process according to claim 1, wherein the disubstitiuted cellulose ether is a cellulose ether in which at least part of the hydroxyl groups present in the constituent anhydroglucose units are substituted with two different substituents chosen from alkyl and hydroxyalkyl radicals.

3. The process according to claim 2, wherein the disubstituted cellulose ether is chosen from methyl ethers of cellulose containing, hydroxyalkyl substituents of from 2 to 4 carbon atoms.

4. The process according to claim 1, wherein the medium contains an agent for adjusting the pH.

5. Process according to claim 1, characterized in that the medium is brought to a temperature between approximately 130° and approximately 165° C.

6. The process according to claim 1, wherein the disubstituted cellulose ether is present in the medium in amounts of between 0.01 and 10% of the weight of the copolymer.

7. The process according to claim 1, wherein water, and the disubstituted cellulose ether are added to the same medium in which copolymer has been synthesized.

8. A stabilized oxymethylene manufactured by the process of claim 1 containing repeated oxymethylene units and 1 to 4 mol % of repeated oxyalkylene units.

9. The stabilized oxymethylene copolymer according to claim 8, wherein the disubstituted cellulose ether is a cellulose ether in which at least part of the hydroxyl groups present in the constituent anhydroglucose units are substituted with two different substituents chosen from alkyl and hydroxylalkyl radicals.

10. The stabilized oxymethylene copolymer according to claim 8, wherein the disubstituted cellulose ether is chosen from methyl ethers of cellulose containing hydroxyalkyl substituents of from 2 to 4 carbon atoms.

11. The stabilized oxymethylene copolymer according to claim 8, wherein the disubstituted cellulose ethe is present in the medium in an amount between 0.01 and 10% of the weight of the copolymer.

* * * * *